(12) United States Patent
Larsen

(10) Patent No.: US 11,073,397 B2
(45) Date of Patent: Jul. 27, 2021

(54) MAGNETIC-INERTIAL GLOBAL POSITIONING SYSTEM

(71) Applicant: Michael S. Larsen, Woodland Hills, CA (US)

(72) Inventor: Michael S. Larsen, Woodland Hills, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 310 days.

(21) Appl. No.: 16/273,845

(22) Filed: Feb. 12, 2019

(65) Prior Publication Data

US 2019/0277638 A1 Sep. 12, 2019

Related U.S. Application Data

(60) Provisional application No. 62/640,388, filed on Mar. 8, 2018.

(51) Int. Cl.
*G01C 21/16* (2006.01)
*G01C 21/02* (2006.01)
*G01C 21/08* (2006.01)

(52) U.S. Cl.
CPC ......... *G01C 21/165* (2013.01); *G01C 21/025* (2013.01); *G01C 21/08* (2013.01)

(58) Field of Classification Search
CPC ...... G01R 15/12; G01R 15/144; G01R 19/00; G01R 19/30; G01R 21/06; G01R 31/261; G01R 31/2623
See application file for complete search history.

(56) References Cited

U.S. PATENT DOCUMENTS

| | | | |
|---|---|---|---|
| 2002/0133958 A1* | 9/2002 | Noureldin | E21B 47/022 33/304 |
| 2005/0046581 A1* | 3/2005 | Lemp, III | G09B 23/06 340/686.1 |
| 2011/0063167 A1 | 3/2011 | Gum et al. | |

FOREIGN PATENT DOCUMENTS

| | | |
|---|---|---|
| JP | 2003065792 A | 3/2003 |
| WO | 2017/180202 A1 | 10/2017 |

OTHER PUBLICATIONS

Henning Umland, "A Short Guide to Celestial Navigation Copyright 1997-2006 Henning Umland All Rights Reserved", Apr. 10, 2006, XP055637863, Retrieved from the Internet: URL: https://www.waypointamsterdam.com/Handy_stuf/Short_Guide_To_Astro_navigation.pdf [retrieved on Oct. 31, 2019].

(Continued)

*Primary Examiner* — Tung X Nguyen
(74) *Attorney, Agent, or Firm* — Tarolli, Sundheim, Covell & Tummino LLP

(57) ABSTRACT

One example includes a magnetic-inertial global positioning system mounted on a platform. The system includes an inertial system configured to determine an approximate latitude associated with an approximate global position of the global positioning system. The system also includes a magnetometer system configured to determine an ambient magnetic field at the approximate global position. The system further includes a location processor configured to compare the ambient magnetic field with a predetermined magnetic field profile to determine an approximate longitude along the determined approximate latitude to determine the approximate global position of the platform.

20 Claims, 7 Drawing Sheets

(56) References Cited

OTHER PUBLICATIONS

European Office Action for Application No. 19160212.7-1003/3537106 dated Dec. 4, 2019.
Japanese Office Action for Application No. 2019-041333 dated Jun. 2, 2020.
Partial European Search Report from corresponding EP 19 16 0212, dated Aug. 1, 2019, attached herein.

* cited by examiner

MAGNETIC-INERTIAL GLOBAL POSITIONING SYSTEM

RELATED APPLICATIONS

This application claims priority from U.S. Patent Application Ser. No. 62/640,388, filed 8 Mar. 2018, which is incorporated herein in its entirety.

TECHNICAL FIELD

The present disclosure relates generally to sensor systems, and specifically to a global positioning system.

BACKGROUND

Location detection has been an important aspect of navigation for centuries. Nautical voyages dating back to ancient times utilized time and/or celestial features to plot approximate locations for navigating across seas and oceans to be able to arrive at intended destinations with relative certainty. In more modern times, location detection is implemented through a variety of technological means. As one example, Global Navigation Satellite Systems (GNSS) such as Global Positioning Satellite (GPS) systems can provide location information based on receiving signals transmitted from satellites having known orbital positions relative to each other. However, because GNSS systems rely on relatively low-level satellite transmissions, it may be difficult to receive the signals based on the location of the vehicle or intervening obstacles. While an initial location of most vehicles can be easily identified (typically by the operator or user), some vehicles, such as autonomous vehicles, may be activated in an unknown location, known as the "kidnapped robot problem", making it more difficult for the vehicle to determine its location.

SUMMARY

One example includes a magnetic-inertial global positioning system mounted on a platform. The system includes an inertial system configured to determine an approximate latitude associated with an approximate global position of the platform. The system also includes a magnetometer system configured to determine an ambient magnetic field at the approximate global position. The system further includes a location processor configured to compare the ambient magnetic field with a predetermined magnetic field profile to determine an approximate longitude along the determined approximate latitude to determine the approximate global position of the platform.

Another example includes a method for determining a global position of a platform. The method includes determining an approximate latitude associated with an approximate global position of the platform via an inertial system associated with the platform. The method also includes determining an ambient magnetic field at the approximate global position via a magnetometer system associated with the platform. The method also includes accessing a predetermined magnetic field profile from a memory associated with the platform. The method further includes comparing the ambient magnetic field with the predetermined magnetic field profile to determine an approximate longitude along the determined approximate latitude to determine the approximate global position of the platform.

Another example includes a magnetic-inertial global positioning system mounted on a vehicular platform. The magnetic-inertial global positioning system includes an inertial system. The inertial system includes a plurality of accelerometers associated with each of three orthogonal axes that are configured to collectively determine a down vector associated with a gravity center of a celestial body and track a down vector direction along a motion trajectory between an initial location and a second location of motion of the vehicular platform. The inertial system also includes a plurality of gyroscopes associated with each of three orthogonal axes that are configured to collectively determine a net rotation of the vehicular platform about a spin axis of the celestial body and to track a spin axis direction between the initial location and the second location of motion of the vehicular platform. The inertial system can be configured to determine an approximate latitude of the vehicular platform in response to the down vector and the net rotation of the vehicular platform between the initial location and the second location. The system also includes a magnetometer system configured to track an ambient magnetic field during the motion along a motion trajectory. The system further includes a location processor configured to compare the ambient magnetic field with a predetermined magnetic field profile to determine an approximate longitude along the determined approximate latitude to determine the approximate global position of the vehicular platform at the initial and to continue to compare the ambient magnetic field with the predetermined magnetic field profile along the motion trajectory to refine the determination of the approximate global position at the second location.

DETAILED DESCRIPTION

Figure 1:
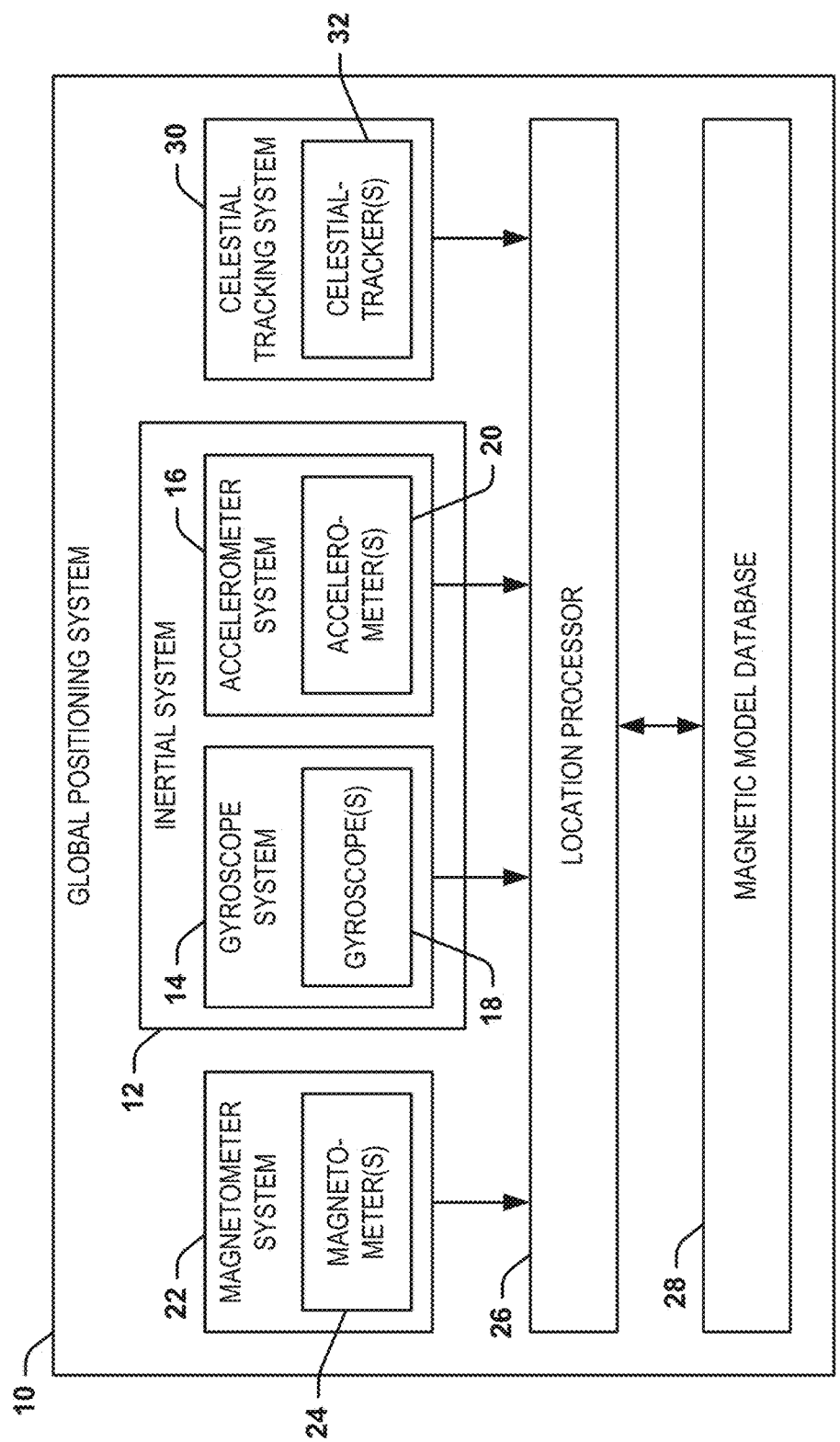
FIG. 1 illustrates an example of a magnetic-inertial global positioning system.

The present disclosure relates generally to sensor systems, and specifically to a magnetic-inertial global positioning system. The magnetic-inertial global positioning system can be mounted on a platform, such as a vehicle platform. As an example, the vehicle platform can be an aerial vehicle (e.g., an unmanned aerial vehicle (UAV)), or can be any of a variety of other platforms (mobile or immobile, manned or unmanned). The magnetic-inertial global positioning system can be configured to determine an approximate global position of the platform (e.g., of the associated vehicle) agnostically as to an initial location and time. For example, the magnetic-inertial global positioning system can determine the approximate global position and an approximate present time upon a power-up condition in any location on a celestial body. As a result, the magnetic-inertial global positioning system addresses the "kidnapped robot problem", such that the magnetic-inertial global positioning system is configured to determine the approximate location and approximate present time in a manner that is completely agnostic as to initial location and time, and without the assistance of a Global Navigation Satellite Systems (GNSS) such as Global Positioning Satellite (GPS) systems. The celestial body is described hereinafter as corresponding to Earth. However, it is to be understood that the principles of operation of the magnetic-inertial global positioning system are equally applicable to any solid celestial body (e.g., the Moon, Mars, or another planet) for which global position is desired to be known.

The magnetic-inertial global positioning system includes an inertial system, such as the inertial navigation system (INS) of the associated vehicle that can be configured to determine an approximate latitude associated with the approximate global position of the platform. For example, the inertial system can include an accelerometer configured to determine a down vector associated with a gravity center of Earth, and can also include a gyroscope system configured to determine a net rotation of the platform about a spin axis of Earth. Therefore, the platform can be arranged initially stationary at a first location and can collect inertial data that includes the acceleration and rotation data to determine the approximate latitude. The magnetic-inertial global positioning system also includes a magnetometer system that is configured to measure an ambient magnetic field (e.g., a net magnetic field that includes magnetic fields in each of three orthogonal axes).

Upon collecting the inertial data to determine the approximate latitude, a location processor can implement a matching algorithm to compare the measured ambient magnetic field with a predetermined magnetic field profile to determine an approximate longitude of the platform. For example, the predetermined magnetic field profile can be part of a global magnetic field model, and can correspond to a predetermined latitude magnetic field profile associated with a predetermined magnetic field about the 360° of longitude at the INS predetermined latitude, such that the location processor can determine an approximate match of the net magnetic field along the circle of longitude at the predetermined latitude. For example, the magnetic field profile can be associated with a global magnetic field anomaly map that can be accessed at initialization of the platform and in response to the measured ambient magnetic field. Accordingly, the location on the latitude of the predetermined magnetic field profile that approximately matches the determined net magnetic field can correspond to the approximate longitude, and thus the approximate global position of the platform.

As an example, the determination of the latitude and longitude can be an initial estimate within an uncertainty region that can be refined. For example, in response to determining an initial estimate of the latitude and longitude, the magnetic-inertial global positioning system can move to gather additional inertial and magnetic field data. As described previously, the magnetic-inertial global positioning system can be vehicle-mounted, such that the vehicle can move to collect additional data that can be implemented to ascertain the global position of the platform. While the platform is in motion, the global positioning system can track the motion of the platform via the inertial system (e.g., via the INS) to determine precise directional data of the motion of the platform. Additionally, the magnetic-inertial global positioning system can continuously collect magnetic field data during the motion of the platform. As a result, the location processor can continue to implement the matching algorithm to continuously compare the magnetic field data that is collected during the motion with the predetermined magnetic field profile. As a result, the magnetic-inertial global positioning system can refine the approximate global position (e.g., approximate latitude and approximate longitude) to determine a more precise global position.

Furthermore, as an example, the magnetic-inertial global positioning system can further include a celestial tracking system (e.g., including one or more celestial (e.g., star)-trackers). The celestial tracking system can be implemented to provide an initial celestial observation (e.g., during the initial stationary position of the global positioning system) to calculate an approximate time based on the approximate global position. For example, in response to determining the initial approximate global position, the magnetic-inertial global positioning system can implement the celestial tracking system to determine an initial approximate present time, which can be based on an initial clock system (e.g., a free-running clock). The magnetic-inertial global positioning system can thus use the approximate present time to further refine the approximate global position, and upon determining the refined global position (e.g., after motion of the platform), the celestial tracking system can further refine the determination of time based on the initial celestial observation. As another example, the celestial tracking system can again provide a celestial observation in response to the determination of the refined global position, which can thus further refine the present time. Accordingly, the magnetic-inertial global positioning system can implement the celestial tracking system to refine the determination of the global position of the magnetic-inertial global positioning system and/or to calculate a precise present time of operation of the magnetic-inertial global positioning system.

FIG. 1 illustrates an example of a magnetic-inertial global positioning system 10. The magnetic-inertial global positioning system 10 can be implemented in any of a variety of navigation or location-service applications to provide an approximate global position of a platform (not shown) on which the magnetic-inertial global positioning system 10 is mounted or located. As an example, the platform can be a vehicle, such that the magnetic-inertial global positioning system 10 can provide an approximate global position of the vehicle. As described herein, the magnetic-inertial global positioning system 10 can provide the approximate global position of the platform in a manner that is agnostic with respect to an initial location of the platform, such as at power-up of the magnetic-inertial global positioning system 10 (e.g., the "kidnapped robot problem"). Additionally, the magnetic-inertial global positioning system 10 can provide the approximate global position of the platform without the assistance of Global Navigation Satellite Systems (GNSS) such as Global Positioning Satellite (GPS) systems.

The magnetic-inertial global positioning system 10 includes an inertial system 12 that is configured to collect inertial data associated with the platform. As an example, the inertial system 12 can correspond to an inertial navigation system (INS) of the associated vehicle or a vehicle-mounted platform. In the example of FIG. 1, the inertial system 12 includes a gyroscope system 14 and an accelerometer system 16. The gyroscope system 14 includes at least one gyroscope 18 that is configured to monitor rotation of the platform about a respective at least one sensitive axis. For example, the gyroscope(s) 18 can include three gyroscopes that have respective orthogonal sensitive axes to be able to determine rotation of the platform about X, Y, and Z axes in three-dimensional space. Similarly, the accelerometer system 16 includes at least one accelerometer 20 that is configured to monitor an acceleration of the platform along at least one input axis. For example, the accelerometer(s) 20 can include three accelerometers that have respective orthogonal input axes to be able to determine acceleration of the platform along the X, Y, and Z axes in three-dimensional space.

The magnetic-inertial global positioning system 10 also includes a magnetometer system 22 that is configured to generate magnetic field data that is associated with an ambient magnetic field at the location of the platform. In the example of FIG. 1, the magnetometer system 22 includes at least one magnetometer 24 that is configured to collect magnetic field measurements. For example, the magnetometer(s) 24 can collect scalar measurements of the ambient magnetic field and vector magnetic field measurements in each of three orthogonal axes. As described herein, the magnetic-inertial global positioning system 10 is configured to determine the approximate global position based on a combination of inertial measurements, as provided by the inertial system 12, and magnetic field measurements, as provided by the magnetometer system 22.

The inertial system 12 provides rotation data ROT that is collected by the gyroscope system 14 and acceleration data ACL that is collected by the accelerometer system 16 to a location processor 26. Additionally, the magnetometer system 22 provides magnetic field data MF that is collected by the magnetometer(s) 24 to the location processor 26. The location processor 26 is configured to determine the approximate global position of the platform, as described in greater detail herein, based on the combination of the rotation data ROT, the acceleration data ACL, and the magnetic field data MF.

During an initial operation of the magnetic-inertial global positioning system 10, such as at power-up, the magnetic-inertial global positioning system 10 may have no knowledge of a current location, and is thus agnostic as to an initial global position and time (e.g., the "kidnapped robot problem"). As an example, the platform on which the magnetic-inertial global positioning system 10 is mounted may not have a GNSS system, or may have a GNSS system that is disabled or inoperable, such as based on occlusion of the signals provided by the associated GNSS satellites. Therefore, the magnetic-inertial global positioning system 10 can determine the approximate global position of the platform based solely on the rotation data ROT, the acceleration data ACL, and the magnetic field data MF. Thus, during the initial operation of the magnetic-inertial global positioning system 10, the magnetic-inertial global positioning system 10 can remain stationary in a first fixed location to determine an approximate latitude associated with the approximate global position of the platform.

As an example, in the first fixed location, the inertial system 12 can collect inertial data associated with the Earth. For example, the accelerometer(s) 20 of the accelerometer system 16 can determine an acceleration acting upon the platform, such as gravity, to determine a down vector that is directed toward the gravity center of Earth. In addition, the gyroscope(s) 18 of the gyroscope system 14 can determine a rotation of the platform, such as about the three orthogonal axes, that is based on the rotation of Earth about the Earth spin-axis. Therefore, based on the combination of the down vector directed toward the gravity center of Earth and based on the known orientation of the platform relative to the Earth spin-axis, the location processor 26 can calculate an angle between the down vector and a vector orthogonal to the Earth spin-axis. As a result, the location processor 26 can determine an approximate latitude of Earth on which the approximate global position of the platform resides.

Figure 2:
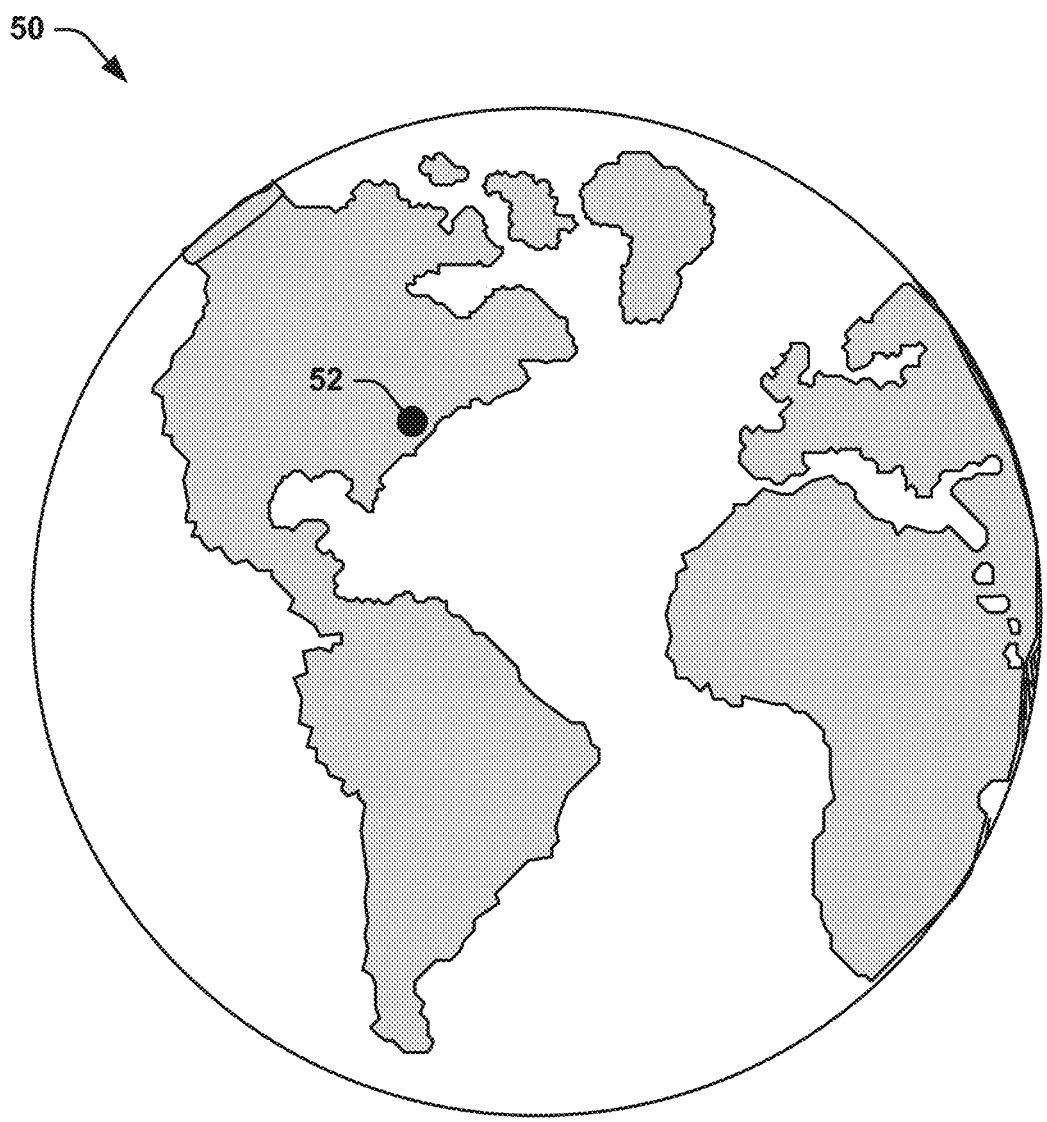
FIG. 2 illustrates an example diagram of Earth.

FIG. 2 illustrates an example diagram 50 of Earth. The diagram 50 demonstrates an approximate location 52 of where the magnetic-inertial global positioning system 10 can be powered up in a manner that is agnostic with respect to the initial position. In the example of FIG. 2, the approximate location 52 is demonstrated as approximately in Arlington, Va., United States, continent of North America, in the Northern and Western Hemispheres. Upon power-up, the global positioning system 10 can be completely unaware of where the platform is located. Additionally, as described in greater detail herein, the global positioning system 10 can also be completely unaware of a present time at which the global positioning system 10 was activated (powered-on).

Figure 3:
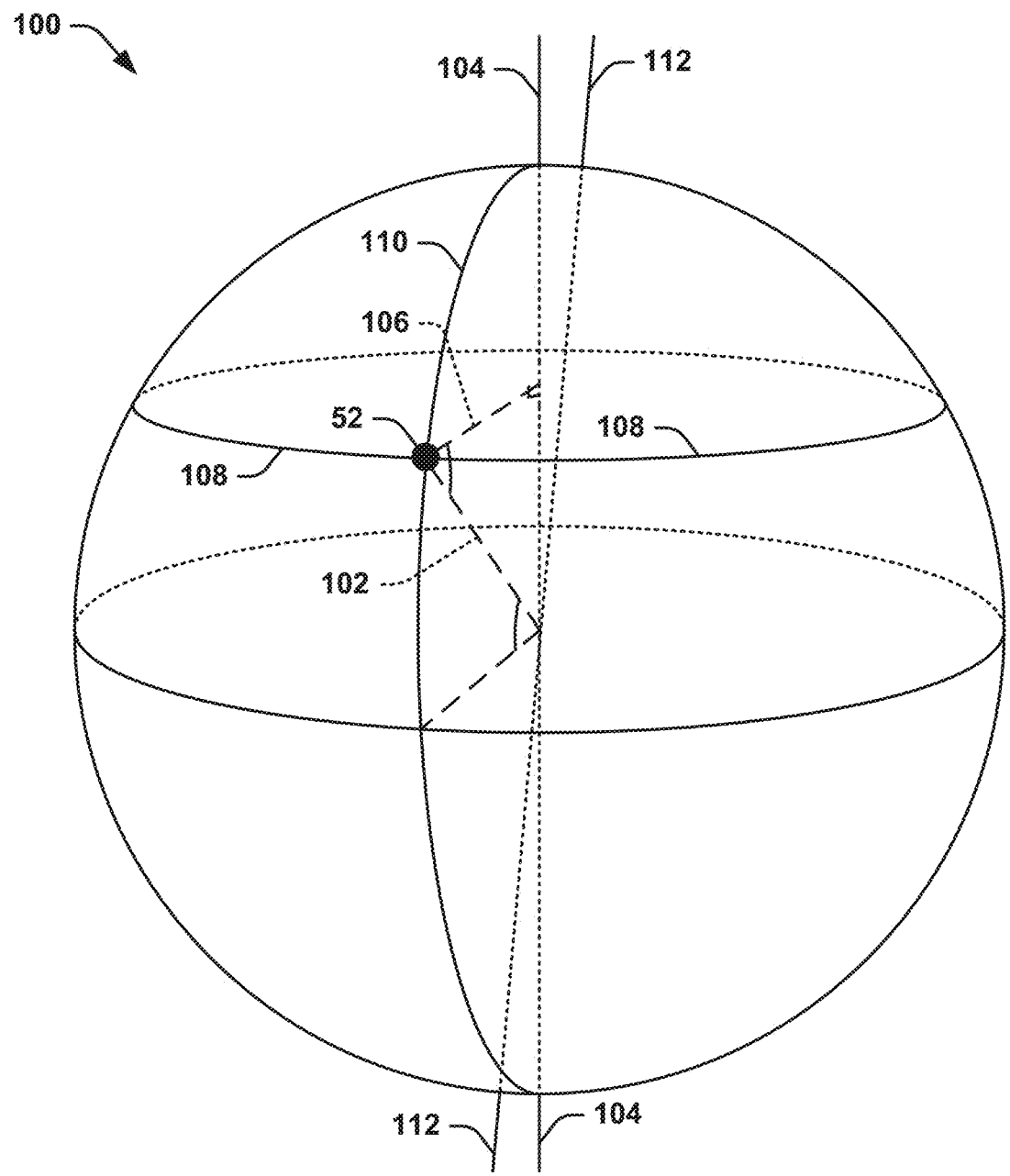
FIG. 3 illustrates an example diagram of determining latitude on Earth.

FIG. 3 illustrates an example diagram 100 of determining latitude on Earth. The diagram 100 is demonstrated as an outline of Earth that also includes the approximate location 52 of the activated platform. As described previously, during an initial operation of the magnetic-inertial global positioning system 10 at power-up, the magnetic-inertial global positioning system 10 has no knowledge of a current location and is thus agnostic as to an initial global position and time. Therefore, in the first fixed location, the inertial system 12 collects inertial data associated with the Earth. In the example of FIG. 3, the accelerometer(s) 20 of the accelerometer system 16 determine a down vector 102 that is directed toward the gravity center of Earth based on gravity acceleration acting upon the platform. For example, the down vector 102 can be directed along the local net gravity field, approximately toward the gravity center of Earth. In addition, the gyroscope(s) 18 of the gyroscope system 14 determine a rotation of the platform, such as about the three orthogonal axes, that is based on the rotation of Earth about the Earth spin-axis 104. The rotation of the platform about three axes based on rotation of the platform associated with the Earth spin-axis 104 can thus be determinative of a vector 106 that is orthogonal to the Earth spin-axis 104. Therefore, an angle θ can be measured between the vector 106 and the down vector 102, which corresponds to an equal angle θ between the equatorial plane of Earth and the down vector 102. Accordingly, the location processor 26 can calculate an approximate latitude 108 on which the approximate location 52 resides. As an example, the approximate latitude 108 can correspond to an approximate latitude, such that the approximate latitude 108 can be determined by the location processor 26 to include an uncertainty region (e.g., of meters to hundreds of kilometers).

In response to determining the approximate latitude 108, the magnetic-inertial global positioning system 10 can be configured to determine an approximate longitude 110 on which the approximate location 52 resides. As an example, the global positioning system 10 can collect ambient magnetic field measurements via the magnetometer(s) 24 of the magnetometer system 22 while at the approximate location 52 of the platform (e.g., while stationary at a first fixed location). The ambient magnetic field measurements can include a magnetic field associated with the Earth polar magnetic field 112 that is off-axis from the Earth spin-axis 104. Because the Earth polar magnetic field 112 is off-axis from the Earth spin-axis 104, the ambient magnetic field can vary greatly about the entire 360° around a given latitude of Earth, including the approximate latitude 108. Therefore, the ambient magnetic field can provide information associated with a given longitude that intersects the given latitude. In addition, the ambient magnetic field can include measurements of fixed Earth-based magnetic field anomalies, such as associated with metallic compositions of the Earth's crust. Such Earth-based magnetic field anomalies can be predetermined (e.g., through geological measurements), such that the ambient magnetic field can include components of both the Earth polar magnetic field 112 and the Earth-based magnetic field anomalies.

Referring back to the example of FIG. 1, the magnetic-inertial global positioning system 10 further includes a magnetic model database 28 that is configured to store a predetermined magnetic field model of Earth. As an example, the predetermined magnetic field model of Earth can be generated based on geological data associated with magnetic field measurements from across the surface of Earth, such that the predetermined magnetic field model of Earth can include a predetermined magnetic field profile across substantially the entire surface of Earth. Therefore, in response to collecting the ambient magnetic field measurements at the approximate location 52 of the platform, the magnetometer system 22 can provide the magnetic field measurements MF to the location processor 26. As an example, the magnetic field measurements MF can include a scalar amplitude of the ambient magnetic field and/or each of three orthogonal vector measurements of the ambient magnetic field. In response, the location processor 26 can implement the magnetic field measurements MF and the approximate latitude 108, as ascertained via the inertial system 12, as described previously to determine the approximate longitude 110. For example, the location processor 26 can access the magnetic model database 28 to obtain a predetermined latitude magnetic field profile that is associated with the determined approximate latitude 108, and can implement a matching algorithm with respect to the predetermined latitude magnetic field profile to mitigate errors in the determined latitude to further refine the approximate latitude, as well as to determine the approximate longitude 110.

Figure 4:
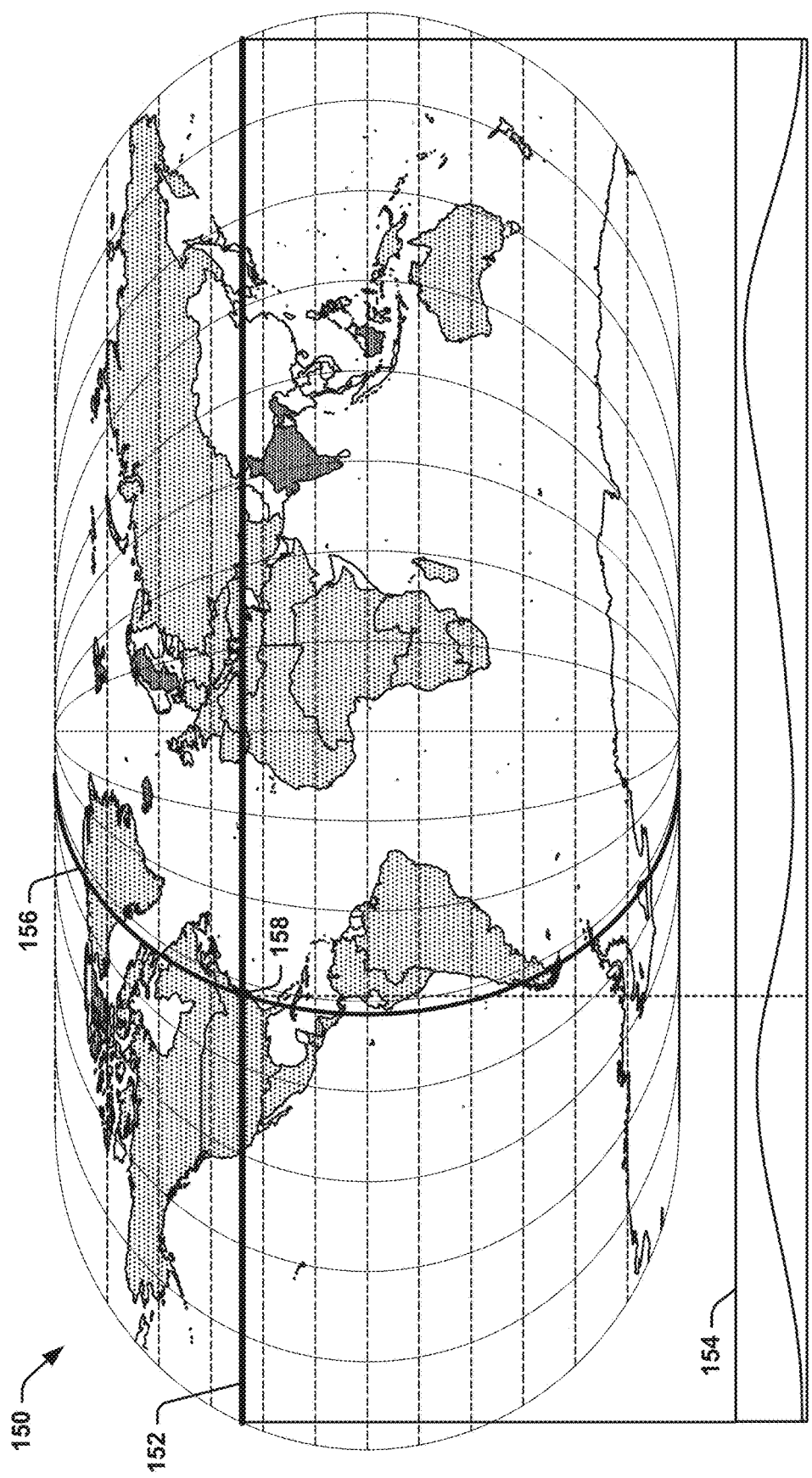
FIG. 4 illustrates another example diagram of Earth.

FIG. 4 illustrates another example diagram 150 of Earth. The diagram 150 of Earth demonstrates a distorted view of a map of the entirety of Earth, and thus an approximate 360° representation of the latitudes of Earth. The diagram 150 also demonstrates an approximate latitude 152 that can correspond to the approximate latitude 108 demonstrated in the example of FIG. 3. The diagram 150 also demonstrates a predetermined latitude magnetic field profile 154 that can correspond to the entire 360° of the approximate latitude 152 (e.g., the latitude 38.878° N of the approximate location 52 in the Arlington, Va.). The predetermined latitude magnetic field profile 154 can thus be stored in the magnetic model database 28 as part of the predetermined magnetic field model of Earth. Therefore, the location processor 26 can implement a matching algorithm of the magnetic field measurements MF with respect to the predetermined latitude magnetic field profile 154. The matching algorithm can thus determine the approximate longitude 110 in response to determining an approximate match of the ambient magnetic field, as provided by the magnetic field measurements MF, with a given magnetic field along the predetermined latitude magnetic field profile 154. Accordingly, the match of the ambient magnetic field along the predetermined latitude magnetic field profile can be indicative of an approximate longitude 156 intersecting the approximate latitude 152, and thus an approximate global position 158 of the platform.

Figure 5:
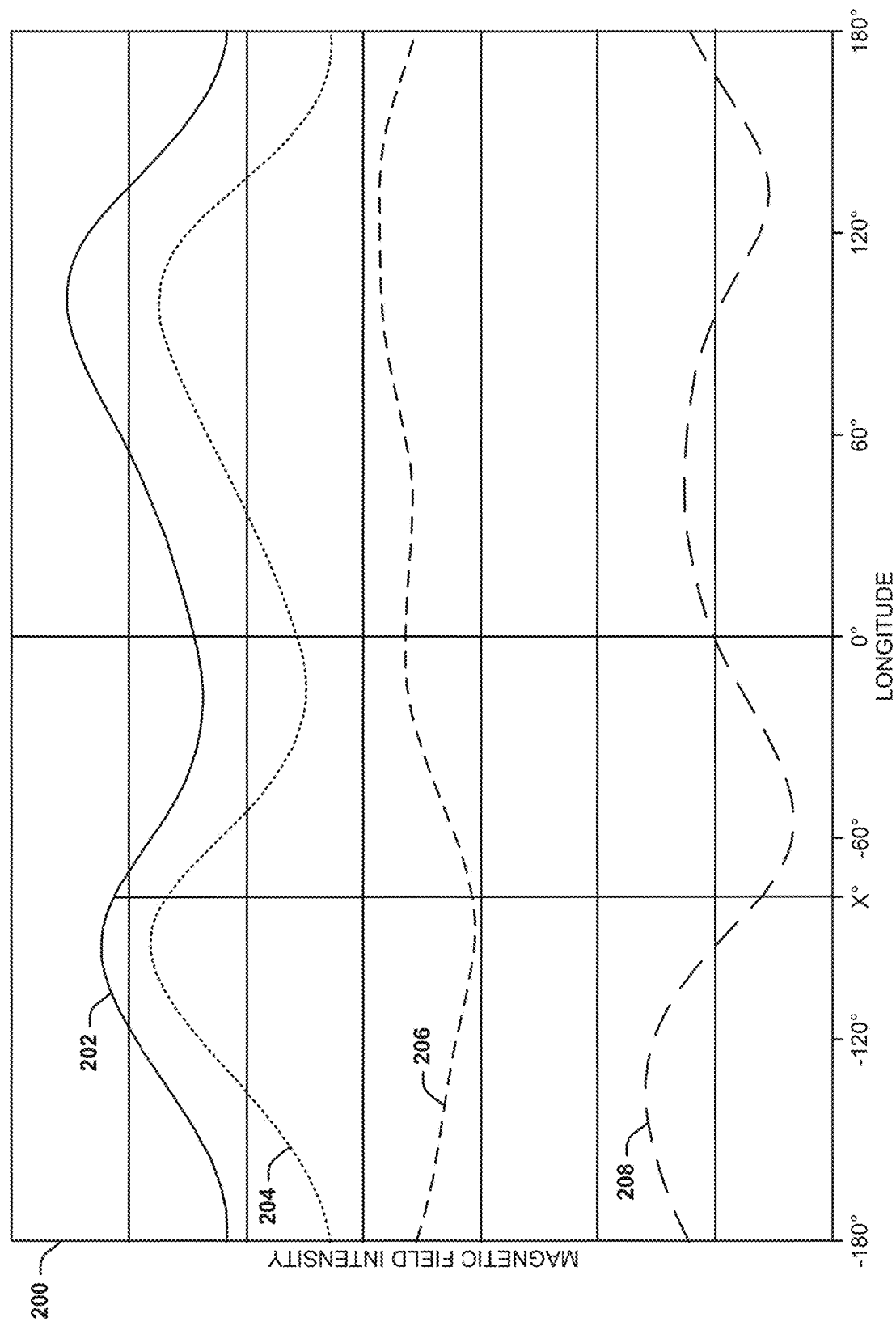
FIG. 5 illustrates an example diagram of a predetermined latitude magnetic field profile.

FIG. 5 illustrates an example of a predetermined latitude magnetic field profile 200. The predetermined latitude magnetic field profile 200 can correspond to the predetermined latitude magnetic field profile 154 in the example of FIG. 4. The predetermined latitude magnetic field profile 200 is demonstrated as plotted as a function of degrees longitude around the predetermined 360° of latitude about the Earth spin-axis 104 (e.g., the latitude 38.878° N of the approximate location 52 in the Arlington, Va.). The magnetic field amplitudes can be expressed as relative amplitudes in Tesla (e.g., nanoTesla).

In the example of FIG. 5, the predetermined latitude magnetic field profile 200 is demonstrated as spanning 360° of latitude about the Earth spin-axis 104, and demonstrates four separate magnetic field profiles. Particularly, the predetermined latitude magnetic field profile 200 includes a total scalar magnetic field amplitude 202, an X-axis magnetic field 204, a Y-axis magnetic field 206, and a Z-axis magnetic field 208. The total scalar magnetic field amplitude 202 can thus correspond to a vector sum (e.g., a Root of the Sum of the Squares) of the X, Y, and Z-axis magnetic fields 204, 206, and 208. The magnetic field amplitudes 202, 204, 206, and 208 can thus represent a given predetermined magnetic field in each of a scalar amplitude and three-axis orthogonal amplitudes, respectively, at a given longitude on the specific latitude represented by the predetermined latitude magnetic field profile 200. As an example, the magnetic field amplitudes 202, 204, 206, and 208 can be predetermined, such as via geographic measurements, and can represent one latitude of a plurality of latitudes of a magnetic field model that substantially covers the surface of the Earth.

As described previously, in response to collecting the ambient magnetic field measurements at the approximate location 52 of the platform, the magnetometer system 22 can provide the magnetic field measurements MF to the location processor 26. As an example, the magnetic field measurements MF can include a scalar amplitude of the ambient magnetic field and each of the three orthogonal vector measurements of the ambient magnetic field. In response, the location processor 26 can implement the matching algorithm with respect to the predetermined latitude magnetic field profile 200 to determine the approximate longitude 110. As an example, the matching algorithm can evaluate the relative measurements of the ambient magnetic field, such as with respect to the scalar measurement and the three orthogonal measurements, with respect to the magnetic field amplitudes 202, 204, 206, and 208. The matching algorithm can thus determine a given longitude that provides a closest match of the measured ambient magnetic field with respect to the magnetic field amplitudes 202, 204, 206, and 208. In the example of FIG. 5, the closest match is demonstrated at approximately 77° W, which may have provided the closest match with of the measured ambient magnetic field with respect to the magnetic field amplitudes 202, 204, 206, and 208, and thus which corresponds to the approximate global position in Arlington, Va.

As described previously, the approximate latitude 152 can be a latitude that is within a region of uncertainty. The approximate longitude 156 can likewise be a longitude that is within a region of uncertainty. Thus, the approximate latitude 152 and approximate longitude 156 can be associated with the approximate global position 158 that is within a global position region of uncertainty (e.g., accurate to within meters to hundreds of kilometers). For example, the global positioning system 10 can be located at an approximate global position in which the local magnetic anomaly is stronger than the Earth polar magnetic field 112, or is located at one of a plurality of similar magnetic fields along the predetermined latitude magnetic field profile. As described previously, the approximate global position 158 can be ascertained by the platform on which the global positioning system 10 is mounted being stationary at a fixed first location. As described in greater detail herein, the platform can begin to move from the fixed first location to a second location to refine the approximate global position to a much more precise determination (e.g., to within meters of uncertainty).

Figure 6:
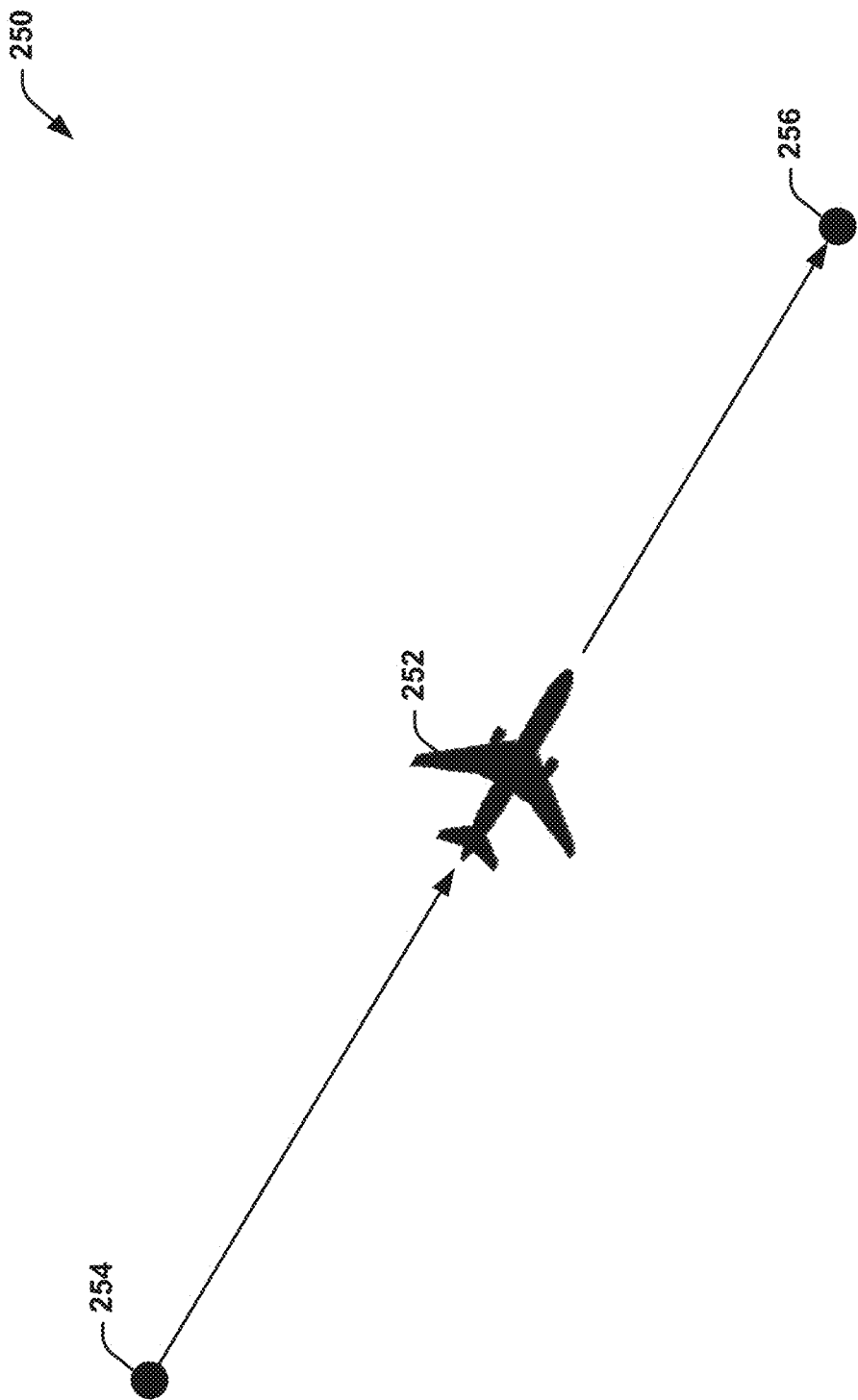
FIG. 6 illustrates an example diagram of refining an approximate global position.

FIG. 6 illustrates an example diagram 250 of refining an approximate global position. The diagram 250 demonstrates an aircraft 252 corresponding to the platform on which the global positioning system 10 can be mounted. While the diagram 250 demonstrates an aircraft, it is to be understood that the vehicle is not limited to the aircraft 252, but could instead be any of a variety of vehicles. In the example of FIG. 6, the aircraft 252 is demonstrated as moving from a first fixed location 254 to a second fixed location 256. While the aircraft 252 is moving, the inertial system 12 of the global positioning system 10 can be configured to substantially continuously collect inertial data, and thus to substantially continuously collect acceleration data ACL and rotation data ROT via the respective accelerometer system 16 and gyroscope system 14. As a result, the inertial system 12, and thus the location processor 26 can monitor a continuous and precise change in location of the aircraft 252 from the first fixed location 254 to the second fixed location 256. As a result, the location processor 26 can very precisely identify the difference in distance and location of the second fixed location 256 relative to the first fixed location 254.

In addition, the magnetometer system 25 can continuously collect ambient magnetic field data MF along the path between the first fixed location 254 and the second fixed location 256. The ambient magnetic field data MF can thus be implemented for refining the approximate location of the aircraft 252. For example, because the location processor 26 can precisely identify a change in location of the aircraft 252 from the first fixed location 254 to the second fixed location 256, the location processor 26 can access the magnetic model database 28 to determine changes in the collected ambient magnetic field that can correspond to an associated change in the magnetic field model stored in the magnetic model database 28. For example, the location processor 26 can implement the matching algorithm to determine a match of changes in the ambient magnetic field along the path from the first fixed location 254 to the second fixed location 256 to a corresponding change in predetermined magnetic field data along an approximately identical path (e.g., angle and distance) in the magnetic field model stored in the magnetic model database 28. The location processor 26 can therefore, determine a significantly more precise approximate global position of the aircraft 252 at the second fixed location 256 (e.g., which could be an instantaneous location mid-flight) based on the changes in magnetic field measurements MF along the path from the first fixed location 254 to the second fixed location 256 relative to the magnetic field model in the magnetic model database 28.

In addition to determining an approximate global position of the platform, the magnetic-inertial global positioning system 10 can be configured to determine an approximate present time (e.g., real time) upon powering-up, and thus in a manner that is agnostic with respect to an initial time of powering-up. Referring back to the example of FIG. 1, the magnetic-inertial global positioning system 10 further includes a celestial tracking system 30 that includes one or more celestial trackers (e.g., star trackers) 32. As an example, the celestial tracking system 30 can provide an approximate present time of operation of the magnetic-inertial global positioning system 10 in response to determining the approximate global position of the platform based on performing one or more celestial observations. For example, typical celestial trackers can be configured to perform celestial observations to determine location information of a platform to assist in navigation based on predetermined celestial location information at a given known time. The celestial tracking system 30 can instead be implemented by the magnetic-inertial global positioning system 10 to operate in the reverse to determine a present time based on a known approximate location of the platform.

For example, the celestial tracking system 30 can be configured to obtain a celestial observation while the platform is initially stationary (e.g., at the first fixed location 254 in the example of FIG. 6) via the celestial tracker(s) 32 and to provide celestial observation data CO to the location processor 26. Upon determining the approximate global position of the platform at the initial stationary location (e.g., based on determining the initial approximate latitude 108 and the initial approximate longitude 110), the location processor 26 can determine an initial approximate present time based on the celestial observation data CO and based on the approximate global position. Given that the planets of the solar system repeat relative positioning with respect to each other once every approximately 5126 years, the location processor 26 can determine the approximate present time based on the assumption that less than half of the planetary alignment cycle time has passed since the magnetic-inertial global positioning system 10 was powered-off (e.g., less than 2,563 years).

As another example, a single celestial observation while the platform is at the first fixed location upon determining the approximate global position of the platform at the initial stationary location can provide a present time that is within a range of uncertainty (e.g., within a few seconds to a few minutes). Such a range of uncertainty can be based on the uncertainty of the determined approximate global position, and can be based on the celestial observation being singular. Therefore, the global positioning system 10 can be configured to refine the present time based on performing multiple celestial observations via the celestial tracking system 30 at various times. For example, as described previously, the platform configured as aircraft 252 can move from the first fixed location 254 to the second fixed location 256. Therefore, the celestial tracking system 30 can perform multiple celestial observations, such as a first celestial observation at the first fixed position 254 and a second celestial observation at the second fixed position 256 (e.g., and/or including multiple additional celestial observations therebetween). Therefore, based on the difference between the celestial observations between the first fixed position 254 and the second fixed position 256, and based on the refined determination of the approximate global position, the magnetic-inertial global positioning system 10 can determine the present time in a much more precise manner (e.g., to within milliseconds of accuracy).

As another example, the global positioning system 10 can include a local time reference (e.g., internal clock), such as a crystal oscillator-based clock. As an example, a typical crystal clock can operate for years on a very small battery, and can be reasonably stable over a small range of temperatures. However, after a year or more of operation at extreme ends of temperature range, the local time reference can still provide time with an uncertainty below approximately twelve hours. However, such a baseline present time after power-up can provide a time reference that can be refined based on the celestial observation(s) provided by the celestial tracking system 30. The baseline time reference can thus refine the present time determination down to the limit of the position uncertainty. Such a determination of the present time can thus be performed much more quickly. For example, if the determination of time becomes sufficiently refined, then it could be possible to implement observations of signals from pulsars/magnetars with known frequency and timing to further refine the determination of time, such as to sub-millisecond levels.

Therefore, as described herein, the determination of the approximate global position can be implemented by the magnetic-inertial global positioning system 10 to refine the determination of the approximate present time. In addition, the determination of the approximate present time can be implemented by the magnetic-inertial global positioning system 10 to refine the determination of the approximate global position. Accordingly, the global positioning system 10 can implement both the approximate present time and the approximate global position in a feedback manner with respect to each other to refine the approximate present time and approximate global position.

Figure 7:
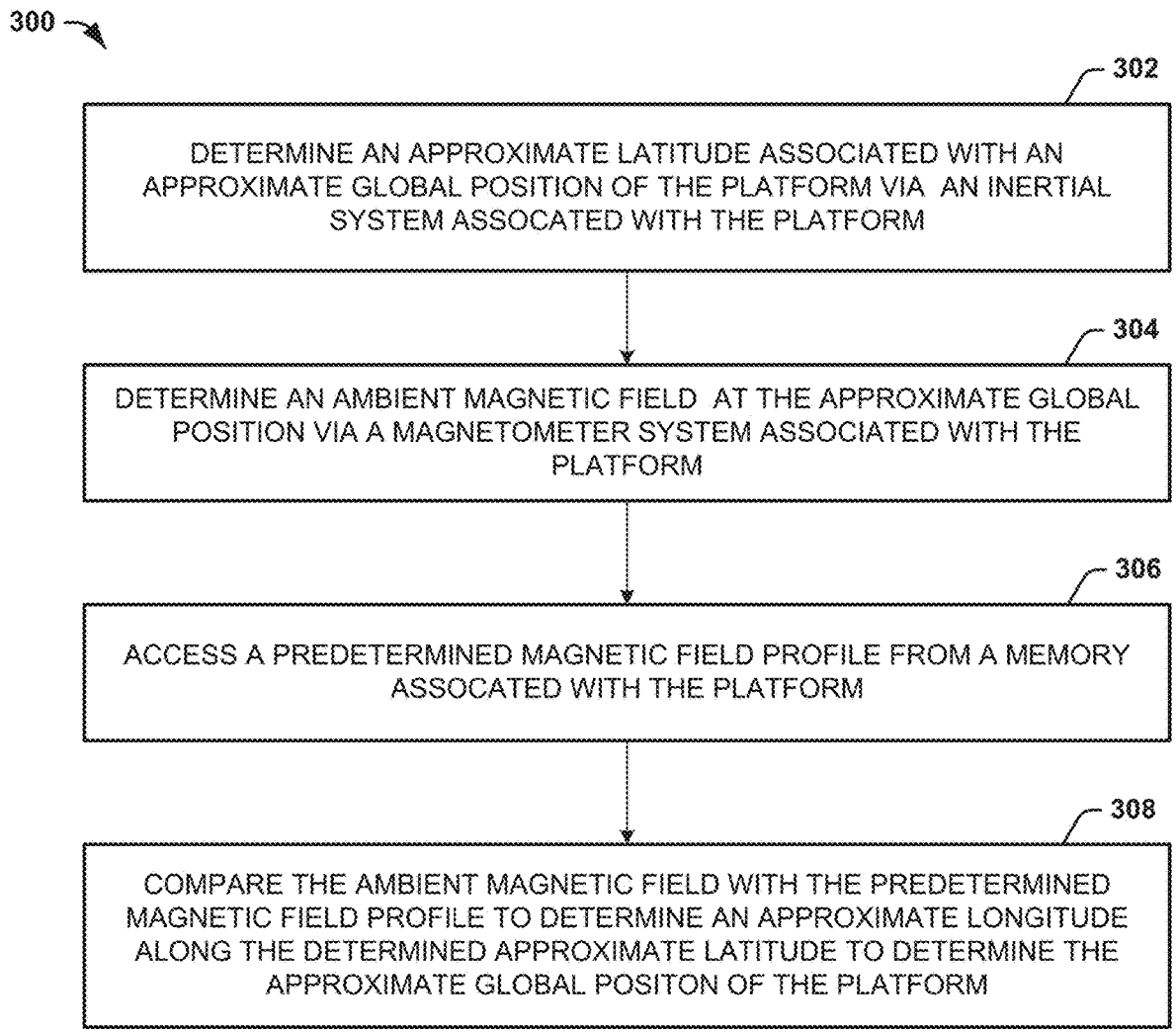
FIG. 7 illustrates an example of a method for determining a global position of a platform.

In view of the foregoing structural and functional features described above, a methodology in accordance with various aspects of the present disclosure will be better appreciated with reference to FIG. 7. While, for purposes of simplicity of explanation, the methodology of FIG. 7 is shown and described as executing serially, it is to be understood and appreciated that the present disclosure is not limited by the illustrated orders, as some aspects could, in accordance with the examples herein, occur in different orders and/or concurrently with other aspects from that shown and described herein. Moreover, not all illustrated features may be required to implement the methodology in accordance with an aspect of the present disclosure.

FIG. 7 illustrates an example of a method for determining an approximate global position of a platform (e.g., the vehicular platform 252). At 302, an approximate latitude associated with an approximate global position of the platform is determined via an inertial system (e.g., the inertial system 12) associated with the platform. At 304, an ambient magnetic field is determined at the approximate global position via a magnetometer system (e.g., the magnetometer system 22) associated with the platform. At 306, a predetermined magnetic field profile (e.g., the magnetic field profile 200) is accessed from a memory (e.g., the magnetic field model database 28) associated with the platform. At 308, the ambient magnetic field is compared with the predetermined magnetic field profile to determine an approximate longitude along the determined approximate latitude to determine the approximate global position of the platform.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims.

What is claimed is:

1. A magnetic-inertial global positioning system mounted on a platform, the global positioning system comprising:
    an inertial system configured to determine an approximate latitude associated with an approximate global position of the platform;
    a magnetometer system configured to determine an ambient magnetic field at the approximate global position, the magnetometer system being further configured to determine the ambient magnetic field during motion of the platform along a motion trajectory; and
    a location processor configured to compare the ambient magnetic field with a predetermined magnetic field profile to determine an approximate longitude along the determined approximate latitude to determine the approximate global position of the platform the location processor being further configured to refine the approximate global position based on comparing the determined ambient magnetic field along the motion trajectory with the predetermined magnetic field profile.

2. The system of claim 1, wherein the inertial system comprises:
    an accelerometer configured to determine a down vector associated with a gravity center of a celestial body associated with the approximate global position; and
    a gyroscope system configured to determine a net rotation of the platform about a spin axis of the celestial body;
    wherein the location processor is configured to determine the approximate latitude based on the down vector and the net rotation of the platform.

3. The system of claim 2, wherein the accelerometer system comprises a plurality of accelerometers associated with each of three orthogonal axes that are configured to collectively determine the down vector, wherein the gyroscope system comprises a plurality of gyroscopes associated with each of three orthogonal axes that are configured to collectively determine the net rotation of the platform.

4. The system of claim 1, wherein the location processor is configured to initially determine the approximate latitude in a range of uncertainty and is further configured to evaluate the ambient magnetic field with the predetermined magnetic field profile in the range of uncertainty of the approximate latitude to determine the approximate longitude.

5. The system of claim 1, wherein the predetermined magnetic field profile is a predetermined latitude magnetic field profile that comprises magnetic field component values in each of three orthogonal axes along a 360° profile of the approximate latitude, wherein the location processor is configured to compare the ambient magnetic field along the predetermined latitude magnetic field profile to determine the approximate longitude associated with the approximate global position.

6. The system of claim 1, further comprising a celestial tracking system configured to perform at least one stellar observation relative to the approximate global position, wherein the location processor is further configured to determine an approximate present time based on the at least one stellar observation.

7. The system of claim 6, further comprising an internal clock configured to provide an initial time estimate, wherein the location processor is further configured to refine the initial time estimate in response to the at least one stellar observation.

8. The system of claim 1, wherein the platform comprises a vehicle, wherein the inertial system is configured to determine the approximate latitude while the vehicle remains stationary at an initial location, wherein the inertial system is further configured to collect inertial data during motion of the vehicle from the initial location to generate navigation data, wherein the motion trajectory is determined based on the navigation data.

9. The system of claim 8, further comprising a celestial tracking system configured to perform a first stellar observation at a first location prior to the motion and to perform a second stellar observation at a second location subsequent to the motion to determine an approximate present time based on the first and second stellar observations.

10. A magnetic-inertial global positioning system mounted on a platform, the global positioning system comprising:
an inertial system configured to determine an approximate latitude associated with an approximate global position of the platform;
a magnetometer system configured to determine an ambient magnetic field at the approximate global position;
a magnetic model database configured to store a global magnetic field map of a celestial body associated with the approximate global position, the global magnetic field map comprising a predetermined magnetic field profile;
a location processor configured to implement a matching algorithm to compare the determined ambient magnetic field with the predetermined magnetic field profile to determine an approximate longitude along the determined approximate latitude to determine the approximate global position.

11. A method for determining an approximate global position of a platform, the method comprising:
determining an approximate latitude associated with an approximate global position of the platform via an inertial system associated with the platform;
determining an ambient magnetic field at the approximate global position and along a motion trajectory via a magnetometer system associated with the platform;
accessing a predetermined magnetic field profile from a memory associated with the platform;
comparing the ambient magnetic field with the predetermined magnetic field profile to determine an approximate longitude along the determined approximate latitude to determine the approximate global position of the platform; and
refining the approximate global position based on comparing the determined ambient magnetic field along the motion trajectory with the predetermined magnetic field profile.

12. The method of claim 11, wherein determining the approximate latitude comprises:
determine a down vector associated with a gravity center of a celestial body associated with the approximate global position via a plurality of accelerometers associated with each of three orthogonal axes; and
determine a net rotation of the platform about a spin axis of the celestial body via a plurality of gyroscopes associated with each of the three orthogonal axes.

13. The method of claim 11, wherein determining the approximate latitude comprises initially determining the approximate latitude in a range of uncertainty, wherein comparing the ambient magnetic field comprises evaluating the ambient magnetic field with the predetermined magnetic field profile in the range of uncertainty of the approximate latitude to determine the approximate longitude.

14. The method of claim 11, wherein accessing the predetermined magnetic field profile comprises accessing a predetermined latitude magnetic field profile that comprises magnetic field component values in each of three orthogonal axes along a 360° profile of the approximate latitude, wherein comparing the ambient magnetic field comprises comparing the ambient magnetic field along the predetermined latitude magnetic field profile to determine the approximate longitude associated with the approximate global position.

15. A method for determining an approximate global position of a platform, the method comprising:
determining an approximate latitude associated with an approximate global position of the platform via an inertial system associated with the platform;
determining an ambient magnetic field at the approximate global position via a magnetometer system associated with the platform;
determining an initial time estimate via an internal clock associated with the platform;
accessing a predetermined magnetic field profile from a memory associated with the platform;
comparing the ambient magnetic field with the predetermined magnetic field profile to determine an approximate longitude along the determined approximate latitude to determine the approximate global position of the platform;
performing at least one stellar observation relative to the approximate global position via a celestial tracking system associated with the platform; and,
refining the initial time estimate in response to the at least one stellar observation.

16. The method of claim 11, wherein the platform comprises a vehicle, wherein determining the approximate latitude comprises determining the approximate latitude while the vehicle remains stationary at an initial location, the method further comprising:
collecting inertial data during motion of the vehicle from the initial location to a second location to generate navigation data; and
determining the motion along the motion trajectory from the initial location to the second location based on the navigation data.

17. A magnetic-inertial global positioning system mounted on a vehicular platform, the magnetic-inertial global positioning system comprising:
an inertial system comprising:
a plurality of accelerometers associated with each of three orthogonal axes that are configured to collectively determine a down vector associated with a gravity center of a celestial body and track a down vector direction along a motion trajectory between an initial location and a second location of motion of the vehicular platform; and
a plurality of gyroscopes associated with each of three orthogonal axes that are configured to collectively determine a net rotation of the vehicular platform about a spin axis of the celestial body and to track a spin axis direction between the initial location and the second location of motion of the vehicular platform, the inertial system being configured to determine an approximate latitude of the vehicular platform in response to the down vector and the net rotation of the vehicular platform between the initial location and the second location;
a magnetometer system configured to track an ambient magnetic field during the motion along a motion trajectory; and
a location processor configured to compare the ambient magnetic field with a predetermined magnetic field profile to determine an approximate longitude along the determined approximate latitude to determine the approximate global position of the vehicular platform at the initial location and to continue to compare the ambient magnetic field with the predetermined magnetic field profile along the motion trajectory to refine the determination of the approximate global position at the second location.

18. The system of claim 17, wherein the predetermined magnetic field profile is a predetermined latitude magnetic field profile that comprises magnetic field component values in each of three orthogonal axes along a 360° profile of the approximate latitude, wherein the location processor is configured to compare the ambient magnetic field along the predetermined latitude magnetic field profile to determine the approximate longitude associated with the approximate global position.

19. The system of claim 17, further comprising:
   an internal clock configured to provide an initial time estimate; and
   a celestial tracking system configured to perform at least one stellar observation relative to the approximate global position, wherein the location processor is further configured to determine an approximate present time based on the initial time estimate and the at least one stellar observation.

20. The system of claim 17, further comprising a magnetic model database configured to store a global magnetic field map of the celestial body, the global magnetic field map comprising the predetermined magnetic field profile, wherein the location processor is configured to implement a matching algorithm to compare the determined ambient magnetic field with the predetermined magnetic field profile to determine the approximate global position.

* * * * *